May 12, 1964 R. R. ROBERTS 3,132,639
CHARCOAL BRAZIERS
Filed March 26, 1962 4 Sheets-Sheet 1
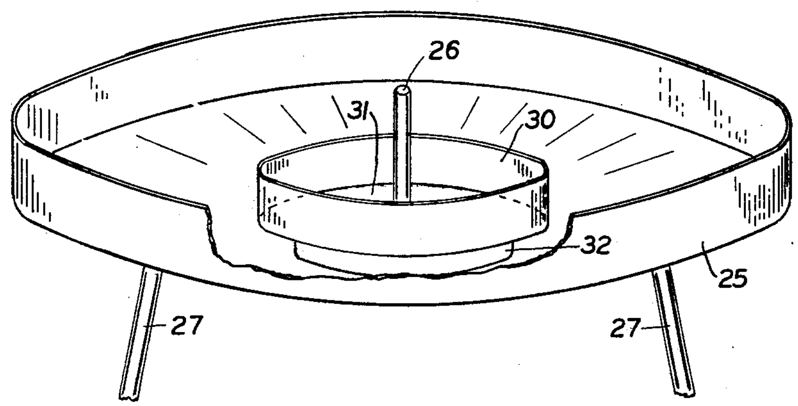
Fig. 1
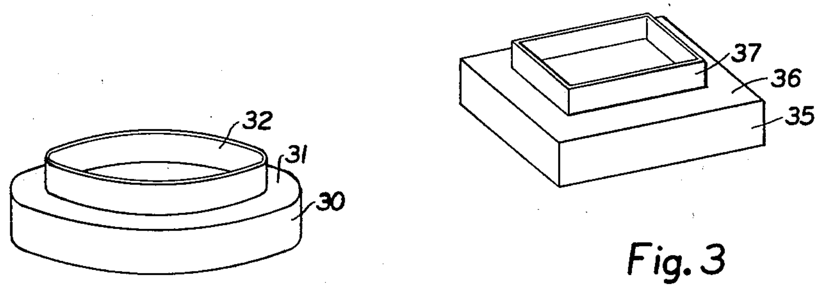
Fig. 2
Fig. 3
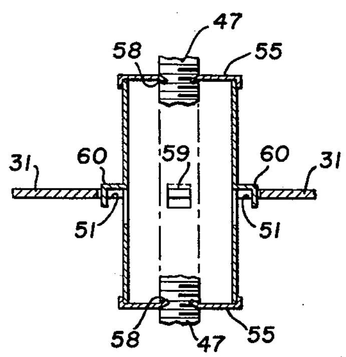
Fig. 10A
INVENTOR.
Ralph R. Roberts

INVENTOR.

Ralph R Roberts

CHARCOAL BRAZIERS

Filed March 26, 1962 4 Sheets-Sheet 3

INVENTOR.
Ralph R Roberts

May 12, 1964 R. R. ROBERTS 3,132,639

CHARCOAL BRAZIERS

Filed March 26, 1962 4 Sheets-Sheet 4

INVENTOR.
Ralph R. Roberts

United States Patent Office

3,132,639
Patented May 12, 1964

3,132,639
CHARCOAL BRAZIERS
Ralph R. Roberts, 105 Berkley Place, Glen Rock, N.J.
Filed Mar. 26, 1962, Ser. No. 182,421
8 Claims. (Cl. 126—25)

This invention relates, in general, to braziers of the type used to hold charcoal for burning, and more particularly to those braziers considered to be of the portable type.

Many of the braziers, bought and used at present, are bowl shaped and usually are equipped with an adjustable grid and other convenience attachments.

Most of the other braziers have large rectangular fire bowls and are often equipped for use with spits as well as adjustable grids.

Most of these braziers are of a large size sufficient for the cooking of food for a number of people. Whereas these large braziers are quite satisfactory in the cooking of food in the amounts required for several people they are inconvenient and wasteful when used in cooking for the needs of a few.

To properly cook over an open flame requires a fire having a sufficient amount of even heat. In the use of charcoal a sufficient amount of depth is required to give sustenance to the fire and to provide adequate heat for the period of time required for cooking. If the fuel is spread too thin the heat will be erratic and of possibly too short a duration.

The operator, desirous of using his present large size brazier with all its built-in conveniences, yet needing to cook for only a few, has either to build a fire of satisfactory composition in the whole brazier, or attempt to make a partial fire in one portion of the brazier and, if the latter, usually with unsatisfactory results.

It is an object of this invention to provide a brazier that can be used in conjunction with the large brazier to provide a suitable fire of the desired size as is desirable in the cooking of food for a few people.

It is also desirable and of convenience for a brazier to be small in size, readily transportable yet able to be used in nearly any outdoor surroundings, such is also an intent of my invention.

Another intent is to provide a brazier that will provide a choice of two sizes of fire bowl for small fires satisfactory for cooking. This brazier is proposed to be readily portable, compact and with means to hold an adjustable grid over either size of fire.

Other objects and a fuller understanding of the invention may be had by referring to the following description and claims, taken in conjunction with the accompanying drawings in which;

FIGURE 1 is an isometric view showing the dual brazier as used in a large brazier;

FIGURE 2 is an isometric view of the dual brazier in an inverted position;

FIGURE 3 is an isometric view of another embodiment of my invention;

FIG. 10A is a sectional view similar to FIG. 10 with the threaded adapter of FIG. 10 placed in the passageway of the dual brazier of FIG. 8;

Figure 4:
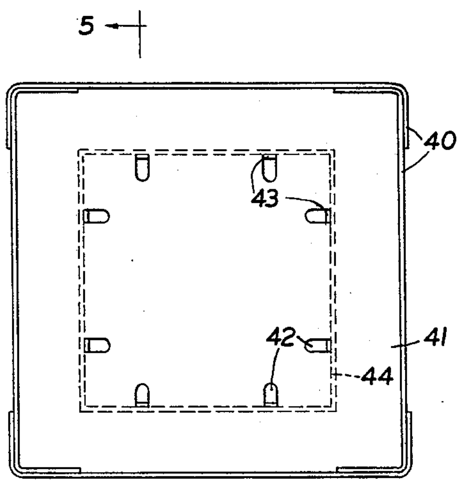
FIGURE 4 is a plan view of the embodiment similar to that shown in FIGURE 3.

In FIGURE 1 one form of my invention is shown placed in a conventional brazier with bowl 25, center adjusting pin 26 and legs 27. A dual brazier is shown resting on the bowl 25. This dual brazier has a larger diameter bowl formed by attaching side wall 30 to a common bottom 31, and attached to this common bottom 31 and extending outwardly therefrom is a side wall 32 of lesser perimeter than side wall 30.

In FIGURE 2 the dual brazier is shown with the smaller side wall 32 in the upper position.

FIGURE 3 illustrates a rectangular version of the dual brazier in which a larger fire bowl is formed by a rectangular side wall 35 being attached to a common bottom 36. A smaller fire bowl is constructed by attaching a smaller rectangular side wall 37 to the common bottom 36.

Figures 5, 6:
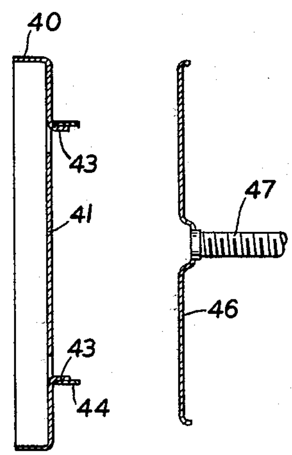
FIGURE 5 is a sectional view taken on the line 5—5 of FIGURE 4.
FIGURE 6 is a sectional view of the grid taken on the line 6—6 of FIGURE 7.

In FIGURES 4 and 5 is illustrated the preferred manner of construction of a rectangular dual brazier, the larger fire bowl is formed from a flat sheet which is cut and bent. In this manner the side elements 40 are cut and bent up from a flat plate bottom 41. Also in the bottom 41 are cut outs 42 from which tabs 43 are pushed and bent downwardly. A smaller fire bowl is formed by making a rectangular frame 44 and attaching to the tabs 43 extending from the bottom 41. No hole is shown in the center of the bottom 41 since the use of the rectangular dual brazier is most frequently desired in conjunction with a larger rectangular brazier. A great many of these large rectangular braziers have either semi-adjustable grids or spits and do not use a post supported grid hence there is no requirement for a center hole.

Figure 7:
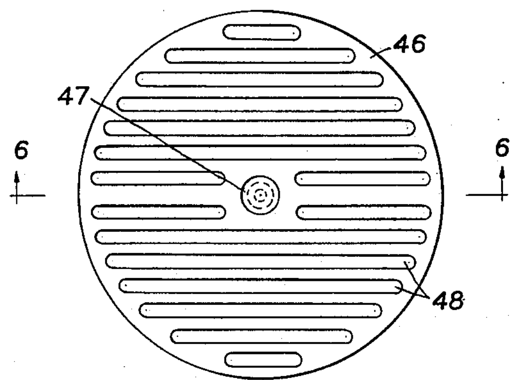
FIGURE 7 is a plan view of a preferred grid.

FIGURES 6 and 7 show a preferred form of grid for use with the dual brazier when the dual brazier is to be used without the benefit of a larger brazier. This grid has a stamped metal top 46 which is attached to a threaded post 47. In the metal top 46 are suitably formed and spaced openings 48 which provide the desired grid pattern shown.

Figure 8:
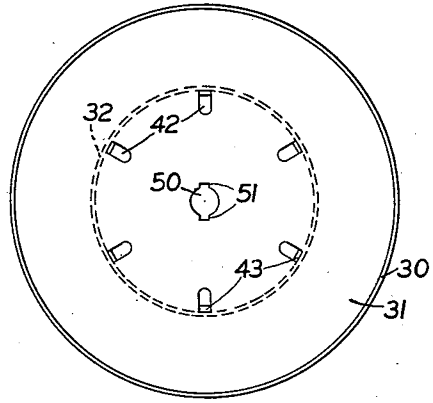
FIGURE 8 is a plan view of the dual brazier similar to that shown in FIGURE 2.

In FIGURE 8 the circular form of the dual brazier shown in FIGURE 2 has embodied the modifications of construction used in the brazier in FIGS. 4 and 5. A larger or outer side wall 30 is either attached or drawn from the common bottom 31. In this common bottom 31 are the cut-outs 42 which provide the metal for tabs 43 which are pushed out and bent at right angles to the bottom 31. Attached to these tabs 43 is a side wall 32 of lesser perimeter than side wall 30. In the center of the common bottom 31 is a formed passageway 50 and as an integral part thereof are two diametrically opposed notches 51.

Figures 9, 10:
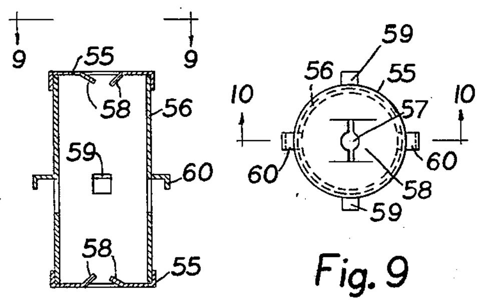
FIGURE 9 is a plan view of the preferred form of threaded adapter.
FIGURE 10 is a sectional view taken on the line 10—10 of FIGURE 9.

The preferred embodiment of the threaded bushing is shown in FIGS. 9, 10 and 10A wherein a pair of ends 55 are formed to fit a tubular element 56. In each end 55 are cut outs 57 with tabs 58 bent to mate with the threaded post 47. In the tubular element 56 are two pair of outwardly formed ears. One pair of ears 59 are substantially at right angles to the axis of the tubular element 56 and are formed in a single plane adapted to engage and be supported by bottom 31 when inserted in passageway 50. Another pair of ears 60 are also substantially at right angles to the axis of the tubular element 56 but in addition have downwardly turned ends. These ears 60 are formed so that the downwardly turned ends will engage and mate with the notches 51 of the passageway 50 in the common bottom 31 when the threaded bushing is inserted into the passageway of the circular dual brazier of FIG. 8.

Figure 11:
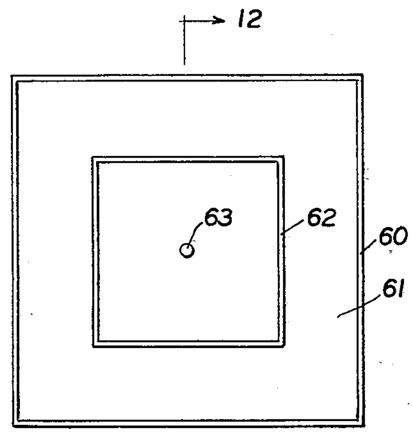
FIGURE 11 is a plan view of a further embodiment of my invention.
Figure 12:
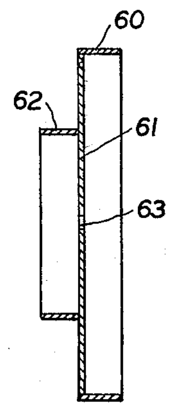
FIGURE 12 is a sectional view taken on the line 12—12 of FIGURE 11.

As exemplified in FIGS. 11 and 12 a dual brazier of generally rectangular shape is formed in which a larger wall 60 extends outwardly from and is attached to a common bottom 61. On the opposite side of the common bottom is attached an outwardly extending wall 62 of lesser perimeter than the larger wall 60. Intermediate of the walls a circular passageway 63 is formed in the common bottom 61.

Figure 13:
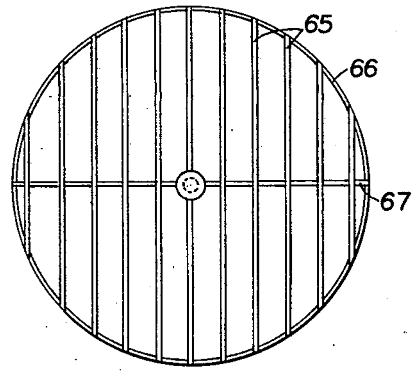
FIGURE 13 is a top view of another embodiment showing a grid construction.
Figure 14:
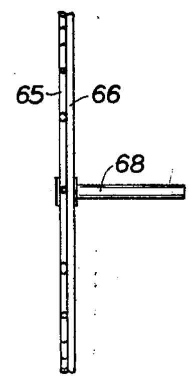
FIGURE 14 is a side view of the grid in FIGURE 13.

An alternate embodiment is shown in FIGURES 13 and 14 in which a grid unit is formed of wire construction. In this grid wires 65 are attached to wire rim 66. The wires 65 and cross brace 67 being attached to post 68.

Figure 15:
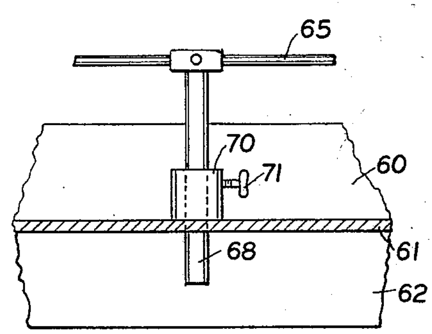
FIGURE 15 is a partial view showing an assembly of components.

In FIGURE 15 the collar 70 is shown on post 68 with thumb screw 71 tightened to hold the collar 70 in place on rod 68.

Figure 16:
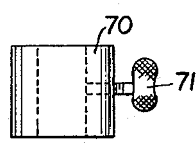
FIGURE 16 is a side view of a clamp sleeve.

FIGURE 16 shows the collar 70 adapted to slide on post 68. A thumb screw 71 engages a suitably threaded means formed in collar 70.

Figure 17:
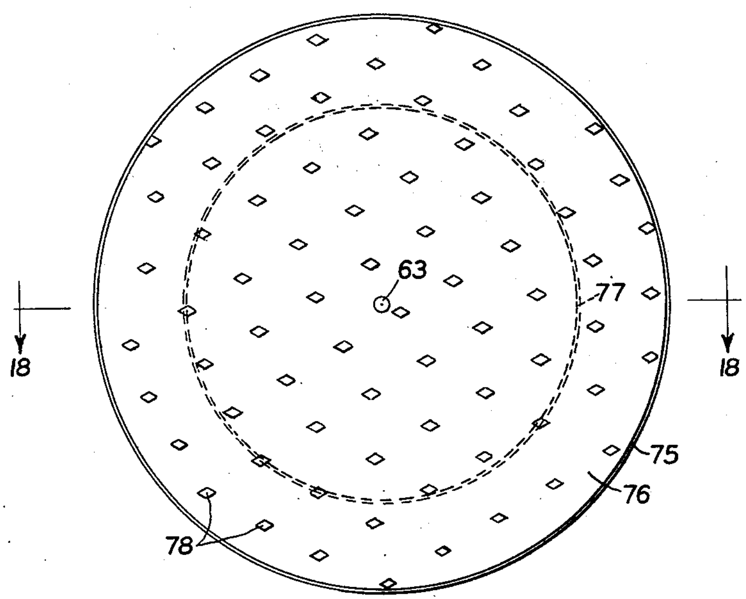
FIGURE 17 is a plan view of a further embodiment of my invention.
Figure 18:
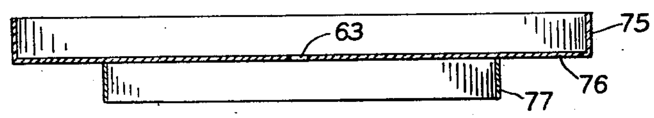
FIGURE 18 is a sectional view taken on the line 18—18 of FIGURE 17.

A further embodiment showing the manner of construction of a round dual brazier is shown in FIGURES 17 and 18. The larger wall 75 is circular in form and is attached to a common bottom 76. An outwardly extending wall 77 of lesser perimeter than wall 75 is attached to the common bottom 76. To provide an adequate supply of air for combustion it is often desirable for draft openings to be in the bottom, thus in this embodiment a multiplicity of openings 78 are formed in the bottom 76. These openings 78 are of any desired shape and of a size small enough to prevent the falling through of small charcoal particles. These openings 78 provide a draft passage for either of the fire bowls being used. Also shown is a circular opening 63 in bottom 76 such as is found in FIGURE 11.

As shown in FIGS. 5, 12, 15, 18 and 19 there is a very nearly equal height to the walls defining both the larger and smaller areas and in all cases the walls extend outwardly from the common bottom an amount sufficient to allow the charcoal to be of a depth to provide sustenance to the fire.

Figure 19:
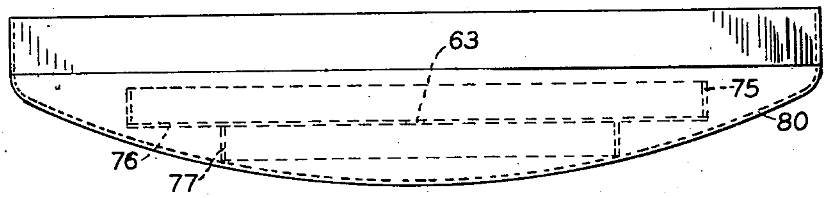
FIGURE 19 is a side view showing the dual brazier placed in a conventional brazier.

FIGURE 19 shows the dual brazier of FIGURES 17 and 18 as it would seat and be used in a large brazier 80. If the smaller fire bowl was desired the dual brazier would be reversed and the rim of wall 75 would rest on the brazier 80.

*Operation and Use*

The dual brazier when used in conjunction with a large brazier usually utilizes the grid of the larger brazier. Either the larger or smaller confine of the dual brazier may be used as desired, the size being ascertained by the amount of fire required to cook the desired amount of food at a satisfactory rate. If the large brazier has a rectangularly shaped fire bowl it is usually more convenient to use a similarly shaped dual brazier such as is shown in FIGURES 3, 4 and 11. If, however, the large brazier is circular a similarly shaped dual brazier is the normal choice; such dual braziers are shown in FIGURES 2, 8, 17 and 18.

No matter which brazier is used, the dual brazier is placed in the fire bowl of the larger brazier with the desired size of the dual brazier upward. If a post supported grid is to be used the central hole in the common bottom is slid over the post and adjusted so that the post may be controlled in the usual manner. After the charcoal has been placed in the upper fire bowl of the dual brazier and the fire started, the grid of the regular brazier is put in place and used in the conventional manner. If the grid of the large brazier is supported by other means, the dual brazier is placed in the fire bowl of the larger brazier with the desired size of the dual brazier upward. A fire is made in the upper fire bowl and the grid put in place for use.

When it is desired to use the dual brazier by itself the brazier is placed on the ground or other suitable support and either the grid shown in FIGURES 6 and 7 or 13 and 14 is used. The firebowl to be used is in the upper position and the charcoal is placed therein and started. The grid is then placed in position and the brazier is then ready to use for cooking.

The dual brazier, when used as its own complete unit, has only the rim that is down to act as its support, this usually being placed on the ground or other suitable place. By the same token, the absence of legs or other additional means of support enable the operator to readily and conveniently transport the dual brazier and appropriate grid.

Having thus explained the advantages of my invention and described in detail the particular embodiments selected for illustrative purposes thereof, it will be understood that the invention is not limited to these specific constructional details, as illustrated and described, but that modifications may be made without departing from the scope and spirit of the appended claims.

What I claim is:

1. In a brazier having a main firebowl, and removably seated therein, an auxiliary dual-chambered brazier having opposed firebowls to provide within the main firebowl a firebowl having one of two smaller capacities than the main firebowl, the auxiliary brazier comprising, (1) a common bottom element, (2) a first sidewall attached to and extending outwardly from the bottom element, the first sidewall and bottom forming therewith a first firebowl, (3) a second sidewall of lesser perimeter than the first sidewall and attached to and extending outwardly from the opposite side of the common bottom element a distance similar to the first sidewall, the second sidewall and bottom forming a second firebowl of lesser bottom area and fuel capacity than the first firebowl of the opposite side whereby as the first sidewall and bottom is used as the firebowl the second sidewall will act as a support for the first firebowl and when the second sidewall and bottom is used as a firebowl the first sidewall will act as a support for the second firebowl.

2. A dual-chambered brazier as in claim 1 wherein said common bottom has formed therein a passageway intermediate of the side walls the passageway therethrough being of sufficient size to permit the free passage of a grid lift rod.

3. A dual-chambered brazier having opposed firebowls of similar depths and unequal capacities, the dual-chambered brazier comprising, (1) a common bottom element having a passageway formed therein and with said passageway having receiving notches formed therein, (2) a first sidewall attached to and extending outwardly from the bottom element the first sidewall and bottom forming therewith a first firebowl, (3) a second sidewall of lesser perimeter than the first sidewall and attached to and extending outwardly from the opposite side of the common bottom element a distance similar to the first sidewall, the second sidewall and bottom forming a second firebowl of lesser bottom area and fuel capacity than the first firebowl of the opposite side, (4) a removable bushing slidable in said passageway and adapted to adjustably hold the post of a grid form, (5) a plurality of shoulder elements extending outwardly from the bushing an amount greater than the passageway and in a common plane substantially at right angles to the bushing, and (6) means on said bushing for engaging the receiving notches in the passageway to prevent rotation of the bushing, whereby as the first sidewall and bottom is used as the firebowl the second sidewall will act as a support for the first firebowl and when the second sidewall and bottom is used as a firebowl the first sidewall will act as a support for the second firebowl.

4. A brazier as in claim 3 wherein said engaging receiving means are formed diametrically opposed notches in the bottom, the notches extending outwardly from the formed passageway, and wherein the means on the bushing to provide engagement includes formed elements extending outwardly and downwardly a portion of said elements extending below the plane of said shoulder elements.

5. A brazier as in claim 4 wherein said first and second side walls enclose substantially rectangular areas.

6. A brazier as in claim 4 wherein said first and second side walls enclose substantially circular areas.

7. A brazier as in claim 4 in combination with a grid form attached to a post, the post movable in said bushing.

8. A brazier as in claim 7 wherein said post has a threaded lower portion and said bushing has internal threads adaptable to engage the threaded portion of the grid post.

References Cited in the file of this patent

UNITED STATES PATENTS

| | | |
|---|---|---|
| 884,767 | Senseney | Apr. 14, 1908 |
| 1,619,740 | Long et al. | Mar. 1, 1927 |
| 2,244,976 | Tinnerman | June 10, 1941 |
| 2,996,597 | Persinger | Sept. 22, 1959 |
| 3,013,550 | Murchie | Dec. 19, 1961 |